United States Patent [19]

Sato et al.

[11] Patent Number: 4,961,160

[45] Date of Patent: Oct. 2, 1990

[54] LINEAR PREDICTIVE CODING ANALYSING APPARATUS AND BANDLIMITING CIRCUIT THEREFOR

[75] Inventors: Shinichi Sato; Atsushi Fukasawa; Takuro Sato; Yasuo Shoji; Haruhiro Shiino; Yukio Suzuki; Hiromi Ando, all of Tokyo, Japan

[73] Assignee: Oki Electric Industry Co., Ltd., Tokyo, Japan

[21] Appl. No.: 186,576

[22] Filed: Apr. 27, 1988

[30] Foreign Application Priority Data

| | | | |
|---|---|---|---|
| Apr. 30, 1987 | [JP] | Japan | 62-104633 |
| May 6, 1987 | [JP] | Japan | 62-108816 |
| May 8, 1987 | [JP] | Japan | 62-110847 |

[51] Int. Cl.[5] .......... G06F 15/31

[52] U.S. Cl. .......... 364/724.01

[58] Field of Search .......... 364/724.01, 724.15, 364/724.1; 381/36, 41

[56] References Cited

U.S. PATENT DOCUMENTS

| | | | |
|---|---|---|---|
| 3,631,520 | 12/1917 | Atal | 381/41 |
| 3,786,188 | 1/1974 | Allen | 381/36 |
| 4,020,332 | 4/1977 | Crochiere et al. | 364/723 |
| 4,092,493 | 5/1978 | Robiner et al. | 381/43 |
| 4,184,049 | 1/1980 | Crochiere et al. | 381/41 |
| 4,379,949 | 4/1983 | Chen et al. | 375/122 |
| 4,544,919 | 10/1985 | Gerson | 364/724.15 |
| 4,587,620 | 5/1986 | Niimi et al. | 364/724.01 |

OTHER PUBLICATIONS

"Linear Prediction: A Tutorial Review" Proceedings of the IEEE, vol. 63 No. 4, Apr. 1975; pp. 561–580.

Makhoul, J. "Stable and Efficient Lattice Methods for Linear Prediction", IEEE Transactions on Acoustics, Speech, and Signal Processing, vol. ASSP-25, No. 5, (Oct. 1977), pp. 423–428.

Morf, M. et al, "Efficient Solution of Covariance Equations for Linear Prediction", IEEE Transactions on Acoustics, Speech, and Signal Processing, vol. ASSP-25, No. 5, (Oct. 1977), pp. 429–433.

Barnwell, III, T. P., "Recursive Windowing for Generating Autocorrelation Coefficients for LPC Analysis," IEEE Transactions on Acoustics, Speech, and Signal Processing, vol. ASSP-29, No. 5, (Oct. 1981), pp. 1062–1066.

*Primary Examiner*—Dale M. Shaw

*Attorney, Agent, or Firm*—Spencer & Frank

[57] ABSTRACT

An LPC analyser calculates LPC coefficients using signals bandlimited to half the sampling frequency of the LPC coefficients to be calculated. Thef calculated LPC coefficients are continuous in time scale and free from aliasing distortion. A bandlimiting circuit suitable for use in the LPC analyser is also disclosed.

2 Claims, 4 Drawing Sheets

LINEAR PREDICTIVE CODING ANALYSING APPARATUS AND BANDLIMITING CIRCUIT THEREFOR

BACKGROUND OF THE INVENTION

This invention relates to an LPC (linear predictive coding) analyser and a bandlimiting circuit therefor.

An example of conventional technology employing LPC analysis is described in "Digital Information Compression-Fundamental Technology of INS and VAN Age" by Kazuo Nakada (pp. 90–97, Akiba-Syuppan). FIG. 1 is an explanatory diagram showing how to define frames for analysis as described in this publication. As shown in FIG. 1, input signals are extracted for each analysis frame and auto-correlation functions $r_i$ (i=0 to p) are calculated at an interval t with the following equation (1):

$$r_i = (1/N) \sum_{N=1}^{N-i} X_n X_{n+i},\ i = 0, 1, \ldots, p \tag{1}$$

Then, LPC coefficients $\alpha_j$ (j=0 to p) are calculated using the calculated auto-correlation functions $r_i$, with the following equation (2):

$$\begin{bmatrix} r_0 & r_1 & \ldots r_{p-1} \\ r_1 & r_0 & \ldots r_{p-2} \\ r_{p-} & r_{p-2} & \cdots r_0 \end{bmatrix} \begin{bmatrix} \alpha_1 \\ \alpha_2 \\ \alpha_p \end{bmatrix} = - \begin{bmatrix} r_1 \\ r_2 \\ r_p \end{bmatrix} \tag{2}$$

$$\alpha_0 = 1$$

However, there is a problem in the above-described technology of LPC analysis. Because the relation between the Nyquist rate of the auto-correlation function and the period for calculating the auto-correlation function is not definite, aliasing distortion is added to the auto-correlation function. This may result in LPC coefficients which are discontinuous in time scale especially at a consonant segment of speech signals at which the signal is non-stationary.

SUMMARY OF THE INVENTION

It is an object of the present invention to provide an LPC analyser capable of removing the above aliasing distortion of the auto-correlation function and of extracting LPC coefficients with excellent continuity on the time scale.

It is another object of the present invention to provide a bandlimiting means for LPC analysis using a very small number of delay elements and arithmetic operational steps.

According to one aspect of the present invention, there is provided an LPC analyser comprising computing means for computing instantaneous covarience functions for a series of signals and for obtaining instantaneous covarience function signals representing said instantaneous covarience functions, bandlimiting means with a flat delay characteristic within the pass-band for bandlimiting of the instantaneous covarience function signals which have been input, normal equation computing means for receiving signals output from the bandlimiting means and solving a normal equation, and sampling means for sampling the result from the normal equation computing unit at a frequency which is higher than the Nyquist frequency of the output signals from bandlimiting means.

Because the above-described LPC analyser is designed to calculate LPC coefficients using signals bandlimited to half the sampling frequency of the LPC coefficients to be calculated, LPC coefficients which are continuous in time scale and unaffected by aliasing distortion can be obtained.

The above-described bandlimiting means with a flat delay characteristic within the pass-band can be realized by using a linear-phase FIR filter. However, if the period at which the LPC coefficients are calculated is made is very long compared with the sampling period of the input signal, the order of the FIR filer becomes very high and realization by hardware becomes difficult.

According to another aspect of the invention, there is provided a bandlimiting means with a flat delay characteristic for the above-described LPC analyser which comprises filters, decimators for reducing the sampling rate and an interpolator for increasing the sampling rate, the filters and the decimators being cascaded alternately and the interpolator being cascaded at the last stage, in which the filters comprise IIR filters.

According to another aspect of the invention, there is provided a flat delay filter having a maximally flat delay characteristic in a pass-band and comprising an IIR filter of the all-pole type having a maximally flat delay transfer function, and at least one of a first-order FIR filter having a real zero on a unit circle, a second-order FIR filter having a complex conjugate pair of zeros on a unit circle, and a fourth-order FIR filter having two pairs of complex conjugate zeros which are in a mirror-image relation on a unit circle, wherein said IIR filter and said at least one first-order FIR filter, second-order FIR filter, and fourth-order FIR filter are cascaded with each other.

With the above configuration, the IIR filter has a maximally flat delay characteristic in the pass-band. The FIR filters of first-order or second-order or fourth-order operate to obtain a desired attenuation characteristic. Therefore, by employing the combination of these filters, the order of the filters is decreased.

Accordingly, the number of the delay elements and the number of multiply-add operation steps are substantially reduced, so that realization by hardware becomes easier.

DETAILED DESCRIPTION OF THE EMBODIMENTS

Figure 2:
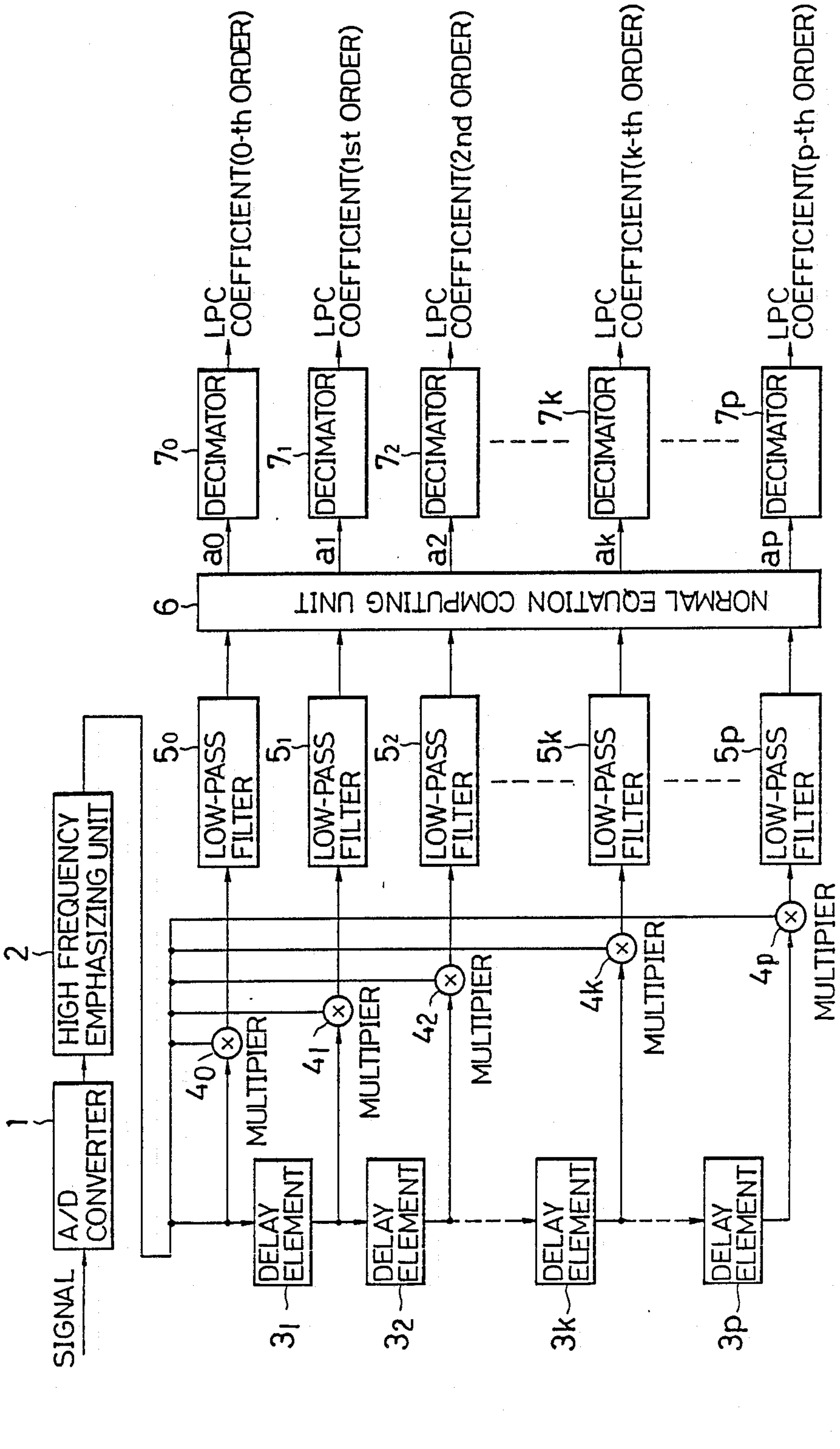
FIG. 2 is a block diagram of an LPC analyser in accordance with an embodiment of the present invention.

FIG. 2 is a block diagram of an LPC analyser of an embodiment of the present invention. In this figure, 1 is an A/D converter for converting analog input signals to digital signals, and 2 is a high-frequency emphasizing unit for emphasizing a high frequency band of the digital signals from the A/D converter 1, with a transfer function of $1-\alpha Z^{-1}$ ($0 \leqq \alpha \leqq 1$).

Reference numbers $3_1$ to $3_p$ delay elements for receiving the output signals from the high frequency emphasizing unit 2, and for delaying the signals by one sampling period.

Reference numbers $4_0$ to $4_p$ denote multipliers for receiving the output signals from the high-frequency emphasizing unit 2, and the output signals from the delay elements $3_1$ to $3_p$, and for performing multiplication. The output signals from the multipliers $4_0$ to $4_p$ are called instantaneous covarience functions of 0th order, 1st order, 2nd order, . . . , k-th order, . . . , p-th order, respectively. The multipliers $4_0$ to $4_p$ constitute the computing means for computing instantaneous covarience functions of the signals.

Reference numbers $5_0$ to $5_p$ identify low-pass filters of the same configuration. Each of them comprises a linear phase FIR filter and receives the output signals from the multipliers $4_0$ to $4_p$. The delay of these filters is flat in the pass-band, regardless of the frequency. In other words, the delay characteristic is flat. These low-pass filters $5_0$ to $5_p$ constitute the bandlimiting means for bandlimiting the frequency characteristics.

Reference number 6 denotes a normal equation computing unit for calculating LPC coefficients $a_0$ to $a_p$ through the following equation (3).

$$\begin{bmatrix} C_0(1) & C_1(1) & C_2(1) \ldots & C_{p-1}(1) \\ C_1(1) & C_0(2) & C_1(2) \ldots & C_{p-2}(2) \\ C_2(1) & C_1(2) & C_0(3) \ldots & C_{p-3}(3) \\ \cdot & \cdot & \cdot & \cdot \\ \cdot & \cdot & \cdot & \cdot \\ C_{p-1}(1) & C_{p-2}(2) & C_{p-3}(3) \ldots & C_p(p) \end{bmatrix} \begin{bmatrix} a_1 \\ a_2 \\ a_3 \\ \cdot \\ \cdot \\ a_p \end{bmatrix} = - \begin{bmatrix} C_1(0) \\ C_2(0) \\ C_3(0) \\ \cdot \\ \cdot \\ C_p(0) \end{bmatrix} \quad (3)$$

$$a_0 = 1$$

In the above equation, where $C_k(n)$ is a signal generated by delaying the output signal from the low-pass filter $5_k$ by n sampling periods.

Reference numbers $7_0$ to $7_p$ denote decimators. Each of them performs decimation with the identical sampling frequency which is higher than the Nyquist frequency of the output signals from the low-pass filters $5_0$ to $5_p$ and they output the LPC coefficients of 0th order to p-th order respectively. These decimator $7_0$ to $7_p$ constitute sampling means.

The operation will now be described.

The A/D converter 1 samples analog input signals, converts them into digital signals and provides them to the high-frequency emphasizing unit 2.

The high-frequency emphasizing unit 2 emphasizes the high-frequency band in the digital signals from the A/D converter 1, according to a transfer function of $1-\alpha Z^{-1}$ ($0 \leqq \alpha \leqq 1$) and outputs them.

The output signals from the high-frequency emphasizing unit 2 are input to the multipliers $4_0$ to $4_p$, directly and through the delay elements $3_1$ to $3_p$. The multipliers $4_1$ to $4_p$ multiply the output signals from the delay elements $3_1$ to $3_p$ respectively by the output signals from the high-frequency emphasizing unit 2. The multiplier $4_0$ multiplies the output signal from the high-frequency emphasizing unit 2 by itself, i.e., performs a squaring operation on the input. The output signals from the multipliers $4_0$ to $4_p$, are supplied through the low-pass filters $5_0$ to $5_p$ in parallel to the normal equation computing unit 6 as the instantaneous covarience functions of 0th order, 1st order, 2nd order, . . . , p-th order.

The normal equation computing unit 6 performs the computation with the equation (3) described above, obtains solutions for the LPC coefficients $a_0$ to $a_p$ and inputs them to the decimators $7_0$ to $7_p$, respectively.

Each of the decimators $7_0$ to $7_p$ performs decimation with the identical sampling frequency, which is higher than the Nyquist frequency of the output signals from the low-pass filters $5_0$ to $5_p$, and outputs the LPC coefficients of 0th order to p-th order obtained respectively.

As has been described above in detail, the LPC analyser discussed above calculates the LPC coefficients using signals bandlimited to half the sampling frequency of the LPC coefficients to be calculated. For this reason, it is possible to obtain LPC coefficients with excellent continuity in time scale and unaffected by aliasing distortion. Moreover, because the LPC coefficients are one of the outstanding features for speech recognition, the LPC analyser of the present invention can be used for feature extraction in speech recognition. Accordingly, it can solve the above problem of the conventional technology.

Figure 1:
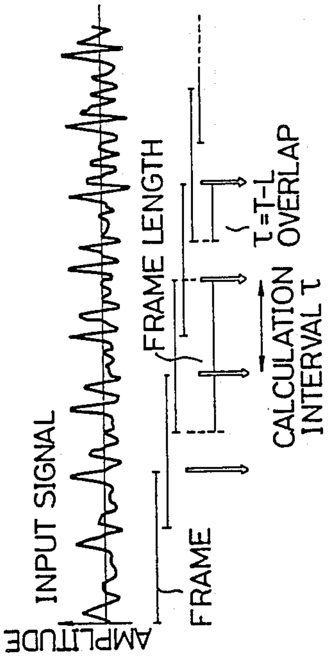
FIG.1 PRIOR ART
FIG. 1 is an explanatory diagram showing how to define frames for analysis as described in a prior art.
Figure 3:
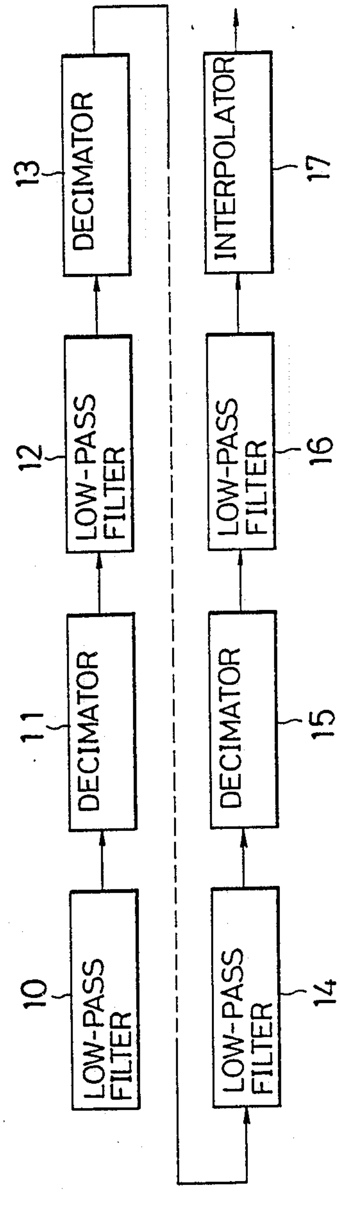
FIG. 3 shows a modification of the bandlimiting means incorporated in the LPC analyser.

In the above description, the low-pass filters $5_0$ to $5_p$ are linear phase FIR filters. If the sampling frequency of the LPC coefficients to be calculated is very low, the order of the low-pass filters $5_0$ to $5_p$ would increase substantially and the quantity of computation would be enormous. In this case, the low-pass filters $5_0$ to $5_p$ can be configured as shown in FIG. 3. This configuration can be expected to produce the same effect.

In FIG. 3, a low-pass filter 10, a decimator 11, a low-pass filter 12, a decimator 13, . . . , a low-pass filter 14, a decimator 15, a low-pass filter 16, and an interpolator 17 are cascaded in the illustrated order.

The low-pass filters 10, 12, . . . , 14, 16 are linear phase FIR filters with a low-pass characteristic and a flat delay characteristic in the pass-band.

The decimators 11, 13, . . . , 15 perform decimation at a sampling frequency which is higher than the Nyquist frequency of the output signals from the low-pass filters 10, 12, . . . , 14, respectively.

The low-pass filter 16 performs the same bandlimitation as the low-pass filters $5_0$ to $5_p$ in FIG. 2.

The interpolator 17 performs sampling with the same sampling frequency as the A/D converter 1 in FIG. 2.

Instead of the linear phase FIR filters for the filters 10, 12, . . . 14, 16, IIR filters may be used. This will further reduce the order.

The invention provides an IIR filter with a flat delay characteristic. In the prior art, it was difficult to realize an IIR filter with a flat delay characteristic.

The principle of the IIR filter with a flat delay characteristic in a pass band is as follows.

The transfer function of a maximally flat delay IIR filter of the all-pole type is expressed by equation (4):

$$H_1(z) = \frac{1}{1 + \sum_{i=1}^{n} b_i z^{-1}} \qquad b_i = (-1)^i \binom{n}{k} \prod_{i=0}^{n} \frac{2\tau/T + i}{2\tau/T + k + i} \tag{4}$$

In the above expressions $\tau$ is the delay at 0 Hz or direct current, and T is the sampling period. Equation (4) shows an attenuation characteristic of the low-pass type with the delay being constant within a region from direct current up to a certain frequency. This attenuation characteristic is, however, not satisfactory in various applications.

The transfer function of an FIR filter having a complex conjugate pair of zeros on a unit circle is expressed by equation (5):

$$H_{F1}(a) = 1 + az^{-1} + z^{-2} \tag{5}$$

The equation (5) has an attenuation pole at the frequency $$f = \frac{1}{2\pi T} \cos^{-1}\left(-\frac{a}{2}\right)$$

If a=2, the result of factorization will be a first-order FIR filter having a transfer function of $1+Z^{-1}$, i.e. having a real zero $z=-1$.

The transfer function of an FIR filter having two pairs of complex conjugate zeros which are in a mirror image relation with respect to a unit circle is expressed by equation (6):

$$H_{F2}(z) = 1 + bz^{-1} + CZ^{-2} + bz^{-3} + z^{-4} \tag{6}$$

If the zeros of equation (6) are $re^{\pm j\theta}$ and $(1/r)e^{\pm j\theta}$, the relation between zeros and coefficients is expressed as equation (7):

$$b = -2\left(\frac{1}{r} + r\right)\cos\theta \qquad c = \frac{1}{r^2} + r^2 + 4\cos^2\theta \tag{7}$$

and equation (6) has a finite attenuation peak at the frequency $f=\theta/2\pi T$.

Both equations (5) and (6) have symmetrical coefficients; therefore, they have a linear phase characteristic, i.e. a flat delay characteristic.

Accordingly, when a specification of a filter is given, the desired filter can be obtained as follows. First, a maximally flat delay transfer function is determined by equation (4) to have a flat delay in the pass-band, and then transfer functions of FIR filters are determined so as to provide a desired attenuation characteristic by selecting appropriate coefficients of a, or b or c in the transfer function of equations (5) and (6). Any number of FIR filters may be used to obtain the desired attenuation characteristic.

An example of low-pass filters $5_0$–$5_p$ in FIG. 2 will now be discribed in detail. The specifications of the low-pass filters $5_0$–$5_p$ in FIG. 2 are as follows:

| | |
|---|---|
| Attenuation: | at direct current: 0 dB |
| | 50 Hz to 4 kHz: more than 60 dB |
| Delay from 0 Hz to 50 Hz: constant | |

Figure 4:
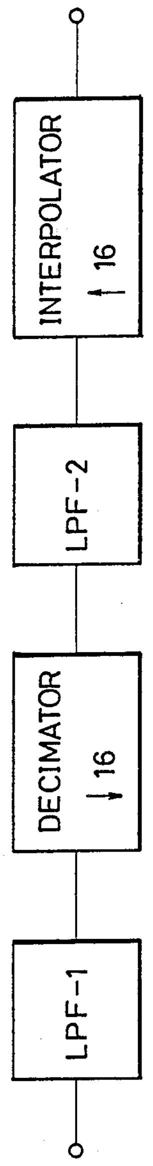
FIG. 4 is a block diagram showing an example of a bandlimiting means.

It comprises an 8 kHz sampling rate low-pass filter LPF-1, a decimator which reduces the sampling rate by a factor 16, a 500 Hz sampling rate low-pass filter LPF-2 and interpolater which increases sampling rate by a factor 16, as shown in FIG. 4.

Figure 6:
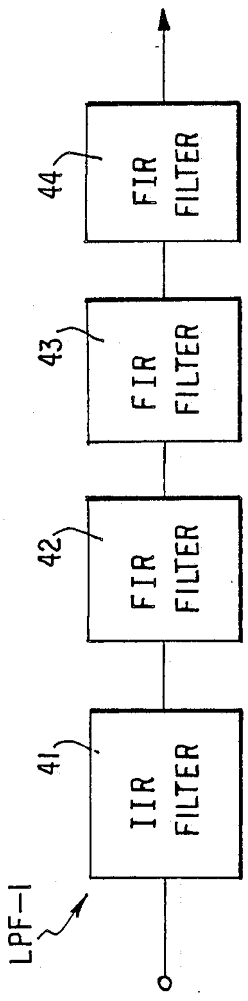
FIG. 6 is a block diagram schematically illustrating an IIR filter which includes an IIR portion and at least one FIR portion.

For the filter LPF-1, the maximally flat delay IIR filter of the all-pole type is a filter 41 of the sixth order and the frequencies of the attenuation poles of second order FIR filters 42, 43, and 44 are 500 Hz, 690 Hz, and 1730 Hz, as illustrated in FIG. 6. For the filter LPF-2, the maximally flat delay IIR filter of the all-pole type would be a filter of the tenth order and the frequencies of the attenuation poles of second order FIR filters would be 50 Hz, 70 Hz, and 100 Hz.

From equation (4) and (5), the transfer function of the filter LPF-1 and the filter LPF-2 is:

$$\frac{\prod_{i=1}^{N_2} (1 + a_i z^{-1} + z^{-2})}{1 + \sum_{i=1}^{N_1} b_i z^{-1}}$$

$N_1 = 6$ for $LPF-1$ and $N_1 = 10$ for $LPF-2$.

$N_2 = 3$ for $LPF-1$ and for $LPF-2$.

According to flat delay filter design principles, low-pass filters $5_0$–$5_p$ in FIG. 2 may be realized with filters of the 16th order. Filters of the 120th order would be needed if the filters were realized with linear phase FIR filters. Consequently, the order of the filter is decreased drastically.

An example of a configuration realized by hardware according to the above concept will now be described.

Figure 5:
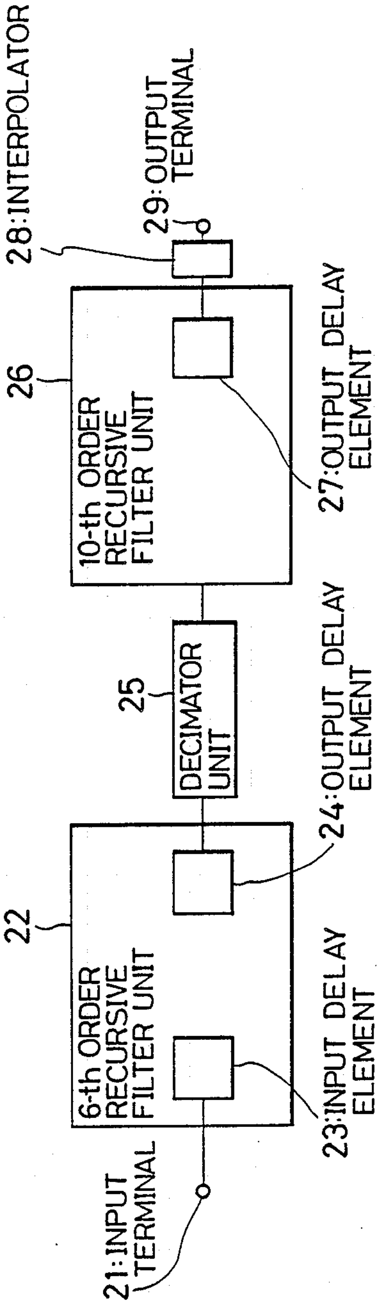
FIG. 5 is a block diagram showing another example of a bandlimiting means.

FIG. 5 is a block diagram showing a specific implementation of the FIG. 4 arrangement and the example discussed above to provide a bandlimiting circuit which can be used in place of the low-pass filters $5_0$ to $5_p$ in FIG. 2. Reference number 21 denotes an input terminal, 22 denotes a 6th-order IIR filter, 23 denotes an input delay element of the 6th-order IIR filter 22, 24 denotes an output delay element of the 6th-order IIR filter 22, 25 denotes a decimator for decimating signals with a decimating rate of 16:1, 26 denotes a 10th-order IIR filter, 27 denotes an output delay element of the 10th-order IIR filter 26, 28 denotes an interpolator, and 29 denotes an output terminal.

The operation of the above bandlimiting circuit is as follows.

Input signals are input through the input terminal 21 to the input delay element 23, which is an entry to the 6th-order IIR filter 22. The 6th-order IIR filter 22 has a total number of 11 delay elements including the input delay element 23, and the output delay element 24, and bandlimits with 15 multiply-add operation steps. The signals which have been bandlimited by the 6th-order IIR filter 22 are transferred from the output element 24 of the 6th-order IIR filter 22 to the 10th-order IIR filter 26 through the decimator 25 for decimating signals with the decimating rate of 16:1. The 10th-order IIR filter 26 has a total number of 16 delay elements including the output delay element 27 of the 10th-order IIR filter 26, and it bandlimits with 25 multiply-add operation steps. The signals which have been bandlimited by the 10th-order IIR filter 26 are transfered from the output delay element 27 of the 10th-order IIR filter 26, to the interpolator 28. The signals which have been interpolated by the interpolator 28 are output through the output terminal 29.

In the above configuration, the output delay element 24 of the 6th-order IIR filter 22 has both the function of the first element of six delay elements for feeding back output samples of the 6th-order IIR filter 22, towards the input terminal, and the function of an input delay element (not shown in the figure) of the 10th-order IIR filter 26. The output delay element 27 of the 10th order IIR filter 26 also has the function of the first element of ten delay elements for feeding back output samples of the 10th-order IIR filter 26, towards the input terminal.

As described above, the total number of the delay elements of the 6th-order IIR filter 22 and the 10th-order IIR filter 26 is 27, and the total number of multiply-add operations in this embodiment is 40. With a conventional bandlimiting circuit with an FIR filter configuration, 121 delay elements and 120 multiply-add operations would be required to obtain the same bandlimiting characteristic as the above described bandlimiting circuit of FIG. 5. Therefore, the bandlimiting circuit of FIG. 5 has about ¼ of the number of delay elements and about 2/5 of the number of multiply-add operation steps, or in other words, the quantity of both the hardware and the number of the multiply-add operation steps are reduced drastically. This allows expansion of other functions of the hardware.

So far the embodiment has been described as comprising two blocks of IIR filters, a 6th-order filter and a 10th-order filter, an interpolator, and a decimator. However, the orders are obviously variable depending on the required bandlimiting characteristic.

As has been described above in detail, the use of IIR filters allows the number of delay elements and the number of multiply-add operation steps to be reduced, and results in size reduction and extended function of the whole system.

What is claimed is:

1. An LPC analyser, comprising:

computing means for computing instantaneous covarience functions of a series of signals and for obtaining instantaneous covarience function signals representing said instantaneous covarience functions;

bandlimiting means with a flat delay characteristic within the pass-band for bandlimiting the frequency characteristics of the instantaneous covarience function signals, wherein the bandlimiting means incudes filters, decimators for reducing the sampling rate and an interpolator for increasing the sampling rate, the filters and the decimators being cascaded alternately and the interpolator being cascaded at the last stage;

normal equation computing means for receiving signals output from the bandlimiting means and solving a normal equation; and sampling means for sampling the result from the normal equation computer means at a frequency which is higher than the Nyquist frequency of the output signals from the bandlimiting means.

2. An LPC analyser according to claim 1, wherein at least one of said filters of said bandlimiting means comprises an IIR filter of the all-pole type having a maximally flat delay transfer function, and at least one FIR filter in series with the IIR filter, said at least one FIR filter being selected from the group consisting of a first-order FIR filter having a real zero on a unit circle, a second-order FIR filter having a complex conjugate pair of zeros on a unit circle, and a fourth-order FIR filter having two pairs of complex conjugate zeros which are in a mirror-image relation on a unit circle.

* * * * *